C. V. FUNDERBURG.
ELECTRIC BURNER.
APPLICATION FILED MAY 19, 1919.
1,375,145.
Patented Apr. 19, 1921.
2 SHEETS—SHEET 1.
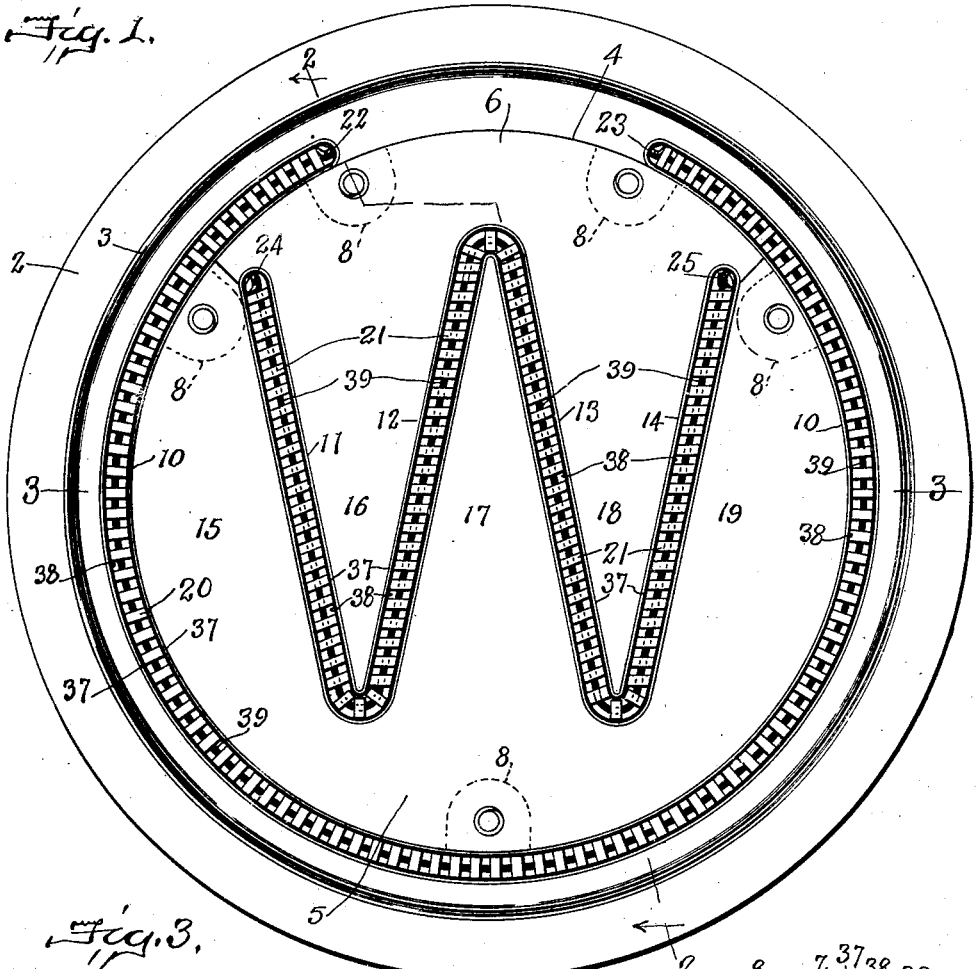
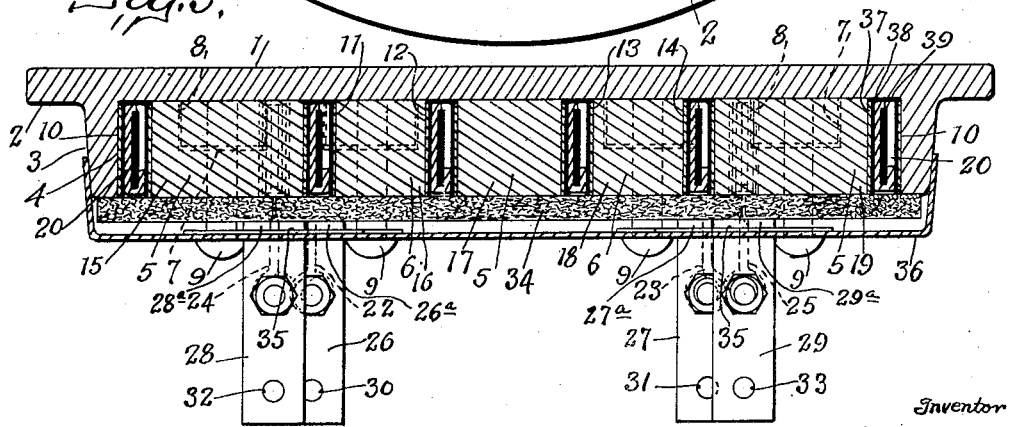
Inventor
Coral V. Funderburg,
Toulmin & Toulmin,
Attorneys C. V. FUNDERBURG.
ELECTRIC BURNER.
APPLICATION FILED MAY 19, 1919.
1,375,145.
Patented Apr. 19, 1921.
2 SHEETS—SHEET 2.
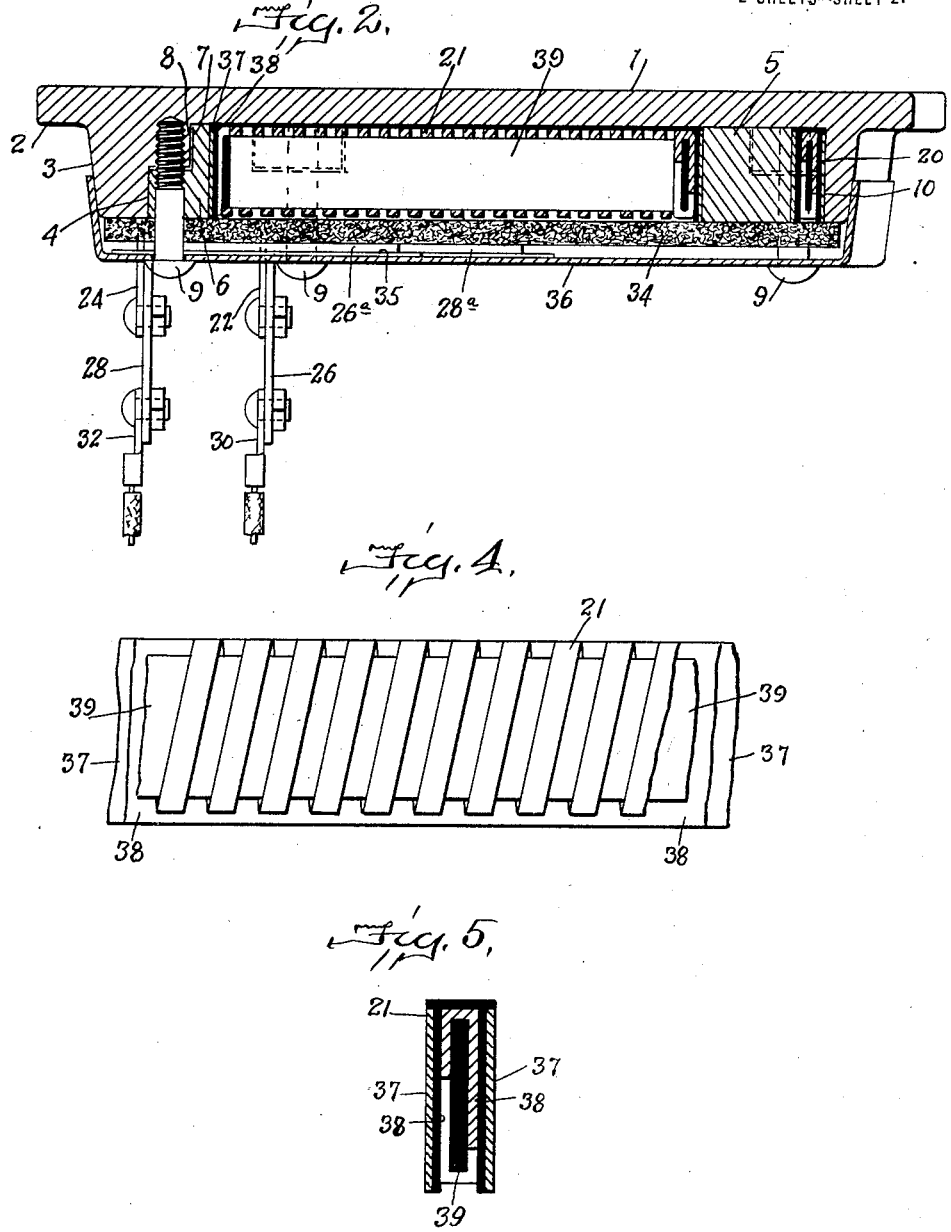
Inventor
Coral V. Funderburg,
Toulmin & Toulmin,
Attorneys

UNITED STATES PATENT OFFICE.

CORAL V. FUNDERBURG, OF YELLOW SPRINGS, OHIO.

ELECTRIC BURNER.

1,375,145.  Specification of Letters Patent.  Patented Apr. 19, 1921.

Application filed May 19, 1919. Serial No. 298,019.

*To all whom it may concern:*

Be it known that I, CORAL V. FUNDERBURG, a citizen of the United States, residing at Yellow Springs, in the county of Green and State of Ohio, have invented certain new and useful Improvements in Electric Burners, of which the following is a specification, reference being had therein to the accompanying drawing.
This invention relates to electric burners and has for its particular object to provide an improved burner adapted for use on a cooking and baking stove and for other purposes, such as heating furnaces, etc.
An object of my invention is to employ an improved arrangement of coils and insulation whereby the absorption and radiation of the heat is rendered most effective and deterioration of the coils resulting from their use is minimized.

An important object realized in the novel arrangement of the heating coils in the preferred form of my invention, consists in employing in connection with the coils massive portions of metal which becoming heated serve to distribute the heat evenly by radiation thereof over comparatively extended areas, thereby making the burners especially applicable for cooking or baking purposes.
A further object of the invention realized by employing the massive portions of metal in connection with the burners consists in the absorption and radiation of the heat, as stated, and in the retention and radiation of heat for comparatively long intervals after the current has been shut off from the burners.

This retention and radiation of heat by the metal portions serves the important purpose of protecting the heating coils against deterioration caused by too rapid cooling thereof when the current is shut off, the coils being associated with the metal in a manner that the same will cool gradually with the metal and thus prevent the harmful effect upon the coils which results when their temperature is changed too rapidly from hot to normal.

Furthermore the retention and radiation of heat by the metal long after the current has been shut off from the burners tends to economy in current consumption and, what is more important, serves the very useful purpose of more gradually completing the cooking or baking operations brought to a certain point with the burners on; the arrangement being in effect the same as the principle employed in certain well known types of fireless cookers. In practical tests made of this feature of my invention it was found that water can be sustained at the boiling point by one of the burners thirty minutes after the current is shut off. In other tests it was found that heat in a double-lined oven can be maintained at the baking point, substantially at 350° F. for three hours after the current has been shut off.

A further feature of improvement in my invention consists in inclosing the coils in the metal portions so that the coils are not exposed to the atmosphere. In this way the heat is conveyed entirely by radiation from the metal and is, therefore, more evenly applied to the cooking or baking utensils. This arrangement serves the further purpose of protecting the coils from any material which may overflow the cooking utensils which is an unsatisfactory condition in stoves where open coils are used, as the overflow material enters and covers the coils and, if not removed, tends to cause burning out of the coils, and if removed in the usual careless manner the coils are frequently damaged by the operation.

An object of the invention is to provide a burner which may be manufactured at low cost, which is simple and durable in construction and long lived in use, also which will not readily be rendered out of adjustment in ordinary usage or by the rough usage incident to stocking and shipping of products of this character.

Referring to the accompanying drawings:

Figure 1 is a bottom plan view of the improved burner with the parts constituting the lower cover of the burner removed;

Fig. 2 is a cross sectional view of the burner taken on the line 2—2 of Fig. 1;

Fig. 3 is a cross sectional view taken on the line 3—3 of Fig. 1 and having the parts constituting the lower cover of the burner assembled thereon;

Fig. 4 is an enlarged view in longitudinal detail showing a broken section of the heating coils and insulation on one side thereof; and Fig. 5 is an enlarged view in cross section showing the heating coils and their insulation.

The metal housing for the heating coils may be made in an integral piece having the coil grooves machined therein, but in the preferred form of construction here shown my improved burner consists of an integral plate 1 and annular flanges 2 and 3. The flange 2 serves as a support for the plate when the same is applied in the usual manner to a cooking stove, and the flange 3 surrounds a circular space 4 which is occupied by irregular shaped metal insert plates 5 and 6 which are provided with depressions 7 adapted to fit over lugs 8 projecting downwardly from the plate 1; the inserts being secured to the plate 1 by screws 9 extending through the inserts adjacent the depressions 7 and threaded into lugs 8, as shown in the drawings.

The insert plates 5 and 6 assembled in relation to the flange 3, as shown in Fig. 1, form a substantially circular shaped housing for the heating coils; an annular groove 10 being formed between the outer edges of the plates 5 and 6 and the flange, and grooves 11, 12, 13 and 14 being formed between the oppositely disposed projections 15, 16, 17, 18 and 19 of the insert plates. In this manner the grooves for the heating coils may be formed in the housing plate without machining operations, as no close dimensions in fitting are required, thus making the plate cheap to manufacture and also increasing the facility in which coils may be replaced.

The groove 10 is occupied by a coil 20 having terminals 22 and 23 which may be connected to any suitable source from which electrical current may be supplied. The grooves 11, 12, 13 and 14 are occupied by a coil 21 having terminals 24 and 25 which may be connected to the same source of current supply.

As here shown the terminals 22—23 and 24—25 are secured to posts 26—27 and 28—29, respectively, the posts being provided with suitable connections 30—31 and 32—33 to the source of electrical current.

As here shown the insert plates 5 and 6 are substantially flush to the lower edge of the flange 3, the outer surface thereof being covered with a layer of asbestos 34 which serves to prevent material radiation of heat downwardly of the plate 1. The posts 26—27 and 28—29 have bases 26ª—27ª and 28ª—29ª extending over the outer surface of the asbestos cover which are covered with plates of insulating material 35 which are held in contact with the bases and the bases in fixed relation with the asbestos material by a cover plate 36 which is secured to the plate 1 by the screws 9.

The grooves 10, 11, 12, 13 and 14 are preferably lined on both sides thereof with strips of copper 37, a strip of insulating material 38 being interposed between the copper strips and the coils, and additional strips 39 being interposed between the coils. These strips of insulating material, as here shown, consist of mica but any suitable material may be used for the purpose.

The arrangement of the coils in the heating plates is such that the maximum degree of heat is conducted from the coils to the plates with the minimum of resistance and substantially all the heat absorbed by the plates is transmitted upwardly by radiation, there being but slight lateral or downward radiation. The full force of the heat generated by the current may be applied for the cooking or baking operations.

As shown in the drawings and, as above stated, the metal portions of the burner are massive and therefore absorb a relatively great amount of heat while the burners are in operation and act to give off heat of gradually decreasing temperature during a long interval of time after the burners are turned off. This acts, as stated, to prevent injury to the heating coils by too rapid cooling and serves the important purpose of enabling completion of the cooking or baking process gradually without further consumption of current.

The coils 20 and 21 are preferably arranged in independent circuits, as shown, and by the use of any suitable switch may be operated independently of each other or together, as may be desired.

While I have shown my invention in a preferred form it will be understood that variations of construction may readily be made by those skilled in the art without departing from the principle or spirit of the invention. Therefore, I do not wish to be limited to the herein specific disclosure of the invention except as defined and comprehended in the appended claims.

Having thus fully described my invention, what I claim as new and desire to secure by Letters Patent, is:—

1. In an electric burner, a housing comprising a closed working surface and massive metal portions disposed relative thereto and adapted to conduct heat absorbed thereby to said working surface during prolonged intervals, grooves arranged relative to the housing on the side opposite said surface between the respective insert portions, heating coils extending through said grooves and insulated from said metal, and connections from the coils leading to a suitable source of current supply.

2. In an electrical burner, a housing comprising a plate having a flange extending oppositely from the working surface thereof, massive portions of metal secured to the plate within the flange to form heat retaining and conducting elements and having their outer surface substantially flush with the outer edge of the flange, grooves arranged relative to the housing on the side opposite said plate between said metal portions, heating coils extending through said grooves and insulated from said metal, and connections from the coils leading to a suitable source of current supply.

3. In an electrical burner, a housing comprising an integral working plate and an annular flange extending oppositely therefrom, massive metal inserts secured to the plate within said flange and adapted to conduct heat absorbed thereby to said working plate during prolonged intervals, an annular groove and an irregular shaped longitudinal groove formed in said housing by the insertion of the metal portions, separate heating coils extending through said grooves, and connections from the coils leading to a suitable source of current supply.

4. In an electrical burner, a housing comprising a closed working surface and massive metal inserts disposed relative thereto, grooves arranged relative to the housing on the side opposite said surface and adjacent to said inserts, heating coils conforming in cross section to said grooves, extending through said grooves, copper strips disposed between the coils and said inserts, insulating strips disposed between the coils and the copper strips and between the coils, and connections from the coils leading to a suitable source of current supply.

In testimony whereof I affix my signature.

CORAL V. FUNDERBURG.